United States Patent [19]
Brienza et al.

[11] 3,987,297
[45] Oct. 19, 1976

[54] MONOPULSE OPTICAL RECEIVER SYSTEM

[75] Inventors: Michael J. Brienza, Westport; Paul M. Danzer, Norwalk, both of Conn.

[73] Assignee: United Technologies Corporation, Hartford, Conn.

[22] Filed: June 9, 1975

[21] Appl. No.: 585,273

[52] U.S. Cl. .......................... 250/209; 250/203 R; 250/216; 356/141; 356/152
[51] Int. Cl.[2] ............................................ G01J 1/24
[58] Field of Search ................ 250/203 R, 208, 209, 250/216; 356/138, 141, 152

[56] References Cited
UNITED STATES PATENTS

| | | | |
|---|---|---|---|
| 3,551,681 | 12/1970 | Astheimer | 250/209 |
| 3,657,547 | 4/1972 | Mansfield | 250/203 R |
| 3,723,744 | 3/1973 | Lim et al. | 356/152 X |

Primary Examiner—Eugene La Roche
Attorney, Agent, or Firm—Dominic J. Chiantera

[57] ABSTRACT

A monopulse optical receiving system is comprised of a plurality of optical sensors for receiving an incident light pulse at angles of incidence within a field of view, and providing in response thereto an output voltage signal whose magnitude is a function of the incident angle, at least two of the sensors being relatively disposed so that a portion of the field of view of one of them overlaps with a portion of the field of view of another one of them to provide an overlapping field of view within which the two sensors provide complementary transmittance gradients, the two sensors further providing mutually complementary voltage signals in response to light incidence within the overlapping field of view, the system further comprising a processing unit which calculates both an immediate coarse angle value for the incident light pulse and a fine angle describing the precise incident angle relative to the coarse angle value.

9 Claims, 8 Drawing Figures

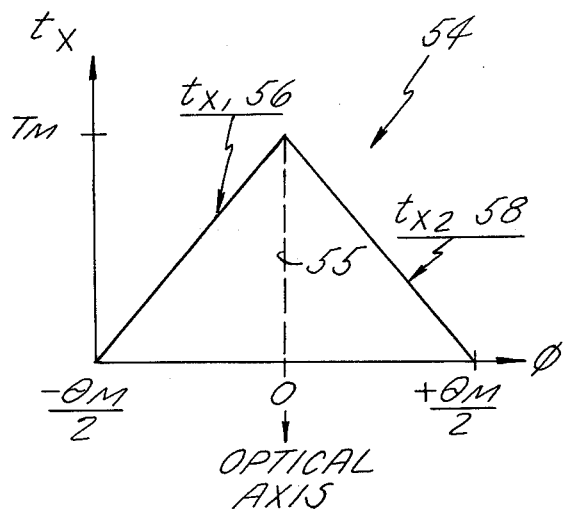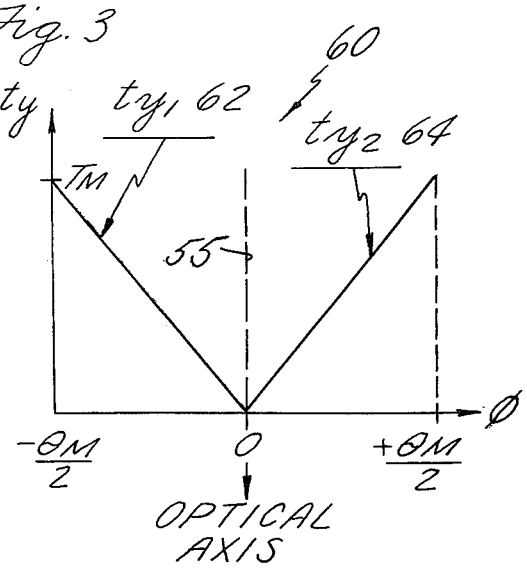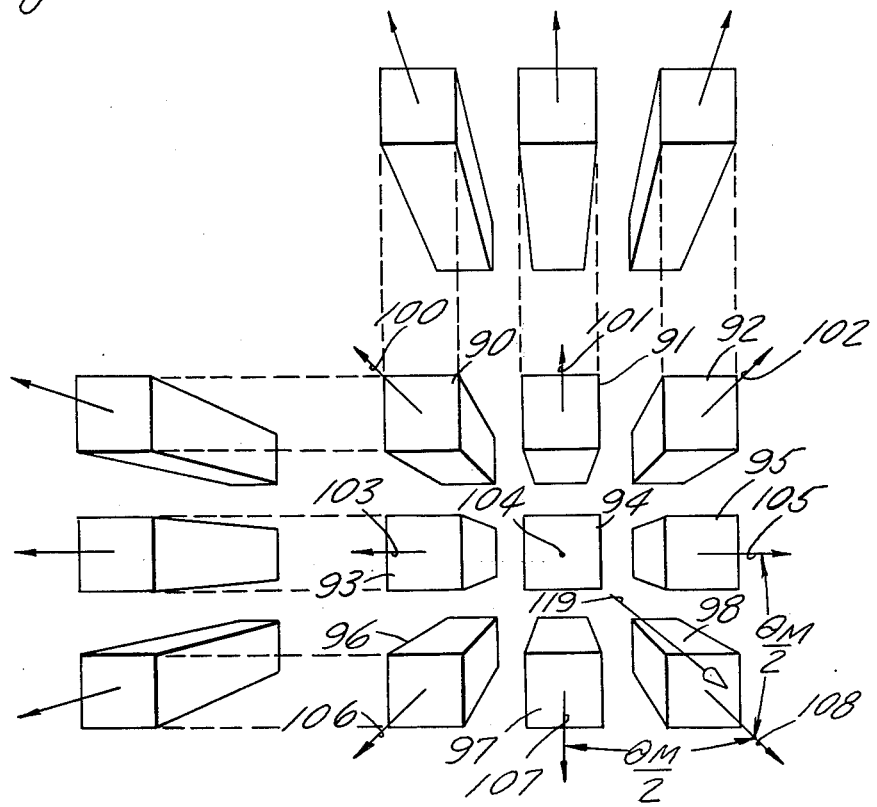

MONOPULSE OPTICAL RECEIVER SYSTEM

BACKGROUND OF THE INVENTION

1. Field of Invention

This invention relates to an optical receiver system, and more particularly to a monopulse optical receiver system for determining the angle of incidence of a single incident light pulse.

2. Description of the Prior Art

Optical radars employing optical receivers or detector circuits for determining the angle of incidence of a reflected, monochromatic light wave are well known in the state of the art. However, these optical receivers require the presence of a continuous incident light beam, or of a continuous series of ligh pulses. One such system is described in a patent to Brunkhorst et al, U.S. Pat. No. 3,800,146 wherein a pulse optical radiation tracker uses a radiation sensitive detector having two pairs of opposed output electrodes mounted in a quadrant to detect an incident light beam or series of incident light pulses and to determine the incident angle of the light beam with respect to the two planes within which the two pairs of electrodes are mounted, the information being provided by the output voltages of the electrodes whose magnitudes are dependent upon the relative location of the incident light spot with respect to the position of the electrodes. Another system for providing incident angle information for a continuous beam of impinging light in an "off axis" tracking system is described in a patent to Webb, U.S. Pat. No. 3,435,246. In the Webb patent the angle of incidence of all impinging light beams which are non-perpendicular to the plane of the optical detecting surface and which deviate from the perpendicular by a determined value are received by the detector through a baffle of two parallel grids which control the amount of incident light impinging upon the surface of a photoelectric sensor in dependence upon the deviation of incident light angle from the perpendicular. As in the hereinbefore mentioned Brunkhorst patent, the system disclosed by Webb also requires a continuous light beam, or a continuous series of light pulses to determine the angle of incidence, which is typical of all of such systems generally disclosed in the art.

The existence of a radiant source producing a continuous coherent source of light permits the use of nulling or scanning devices and systems to make the requisite angle measurement. However, for a situation in which a single light pulse is received, such nulling or scanning devices are inadequate for determining such incident angles. One situation in which single, or monopulse light waves are encountered is that of military warfare employing the use of laser guided bombs. Typically, such laser guided bomb weapons transmit a single pulse of monochromatic light which are non-periodic and which determine the range, and target identification prior to releasing a bomb or firing a missile. The target vehicle exposed to such laser devices is vulnerable and unable to institute countermeasures unless the presence and position of the attacking vehicle is known. Therefore, the target vehicle must determine the angle of incidence of the impinging light beam in order to determine the relative location of the attacking vehicle.

SUMMARY OF THE INVENTION

One object of the present invention is to provide a monopulse optical receiver system for determining the angle of incidence of a single incident light pulse. Another object of the present invention is to provide a monopulse optical receiver system having a diversity of configurations, thereby making it suitable for a wide variety of uses in both the military and commercial fields. Still another object of the present invention is to provide a low cost monopulse optical receiver system.

According to the present invention, a plurality of optical sensors each having a field of view for receiving incident light at angles of incidence within the field of view and for providing in response thereto a signal manifestation of the angle of incidence thereof, are relatively disposed so that at least two of the sensors have portions of their fields of view which overlap to provide an overlapping field of view, the two sensors having complementary transmittance gradients within the overlapping field of view, and the two sensors providing mutually complementary voltage signals in response to light incident within the overlapping field of view. A processor which is responsive to the complementary voltage signals provides a signal proportional to the angle of incidence of the light incident within the overlapping field of view. In further accord with the present invention, the sensors are relatively disposed so that a portion of the field of view of each of at least two of the optical sensors overlaps with a portion of the field of view of at least one other of the optical sensors to provide two mutually exclusive overlapping fields of view, and the processor includes a logic network which is responsive to all of the sensor outputs to provide a signal for identifying which of the sensors are providing the complementary voltage signals, thereby identifying the overlapping field of view within which the light is incident, the processor further including circuit means responsive to the complementary voltage signals from the sensors within whose overlapping field of view light is incident, for providing a signal representative of the ratio of one of the complementary voltage signals to the sum of the complementary signals, this ratio signal being proportional to the angle of incidence of light incident within the overlapping field of view.

In still further accord with the present invention, each overlapping field of view is provided by two optical sensors, each having an optical axis, and each having complementary transmittance gradients centered about its optical axis, the two optical axes being relatively displaced by an angle equal to the angle of the overlapping field of view, such that light incident within the overlapping field of view is converged onto complementary transmittance gradient portions of each of the two sensors. In further accord with the present invention, each overlapping field of view may be provided by a dedicated pair of optical sensors, each having an identical continuous transmittance gradient distributed throughout the sensor field of view and the pair of sensors being relatively disposed such that the fields of view of each overlap fully with the field of view of the other and the sensors provide complementary transmittance values for light incident within the field of view.

In still further accord with the present invention, a plurality of optical sensors are relatively disposed to provide at least one overlapping field of view in each of two substantially orthogonal planes, with a portion of at least one overlapping field of view in one plane being common with a portion of at least one overlapping field of view in the other plane so as to provide a common overlapping field of view, each of the optical sensors having a biplanar transmittance function for providing complementary transmittance gradients to light incident within the common overlapping field of view.

The monopulse optical receiver system of the present invention determines the angle of incidence of a single light pulse incident within an overlapping field of view of at least two optical sensors. The sensors are comprised of optical components well known in the art and provide a low cost, simple sensor configuration. A plurality of sensors may be disposed in an array to form a multiplicity of independent overlapping fields of veiw. A diversity of mounting configurations, in either a single or a multiple number of planes, permits a wide variety of monopulse optical sensor configurations, thereby permitting the use of the system in a wide variety in both commercial and military applications.

These and other objects, features and advantages of the present invention will become more apparent in the light of the following detailed description of preferred embodiments thereof, as illustrated in the accompanying drawing.

BRIEF DESCRIPTION OF THE DRAWING

FIG. 2 is an illustration of the transmittance gradient versus incident light angle of one plane of a biplanar filter used in the preferred embodiment of FIG. 1;

FIG. 3 is an illustration of the transmittance gradient versus incident angle in another plane of the filter used in the preferred embodiment of FIG. 1;

FIG. 5 is a perspective drawing of a plurality of optical sensors mounted in rows and columns in accordance with another embodiment of the invention;

DESCRIPTION OF THE PREFERRED EMBODIMENT

The monopulse optical receiver system of the present invention determines the angle of incidence of a single incident light pulse taken with respect to a receiver reference boresight. As described hereinafter, the combination of at least two optical sensors, each having a field of view centered about an optical axis, with the two optical axes being relatively displaced from each other such that a portion of their individual fields of view overlap to form an overlapping field of view, comprise an optical monopulse with a field of view, referred to herein as a monopulse sector, equal to the overlapping field of view. The two optical sensors provide mutually complementary transmittance gradients to light incident within the overlapping field of view and further provide complementary voltage signals whose magnitude is a function of the angle of incidence. The complementary voltage signals from the individual sensors are presented to a processor which produces an output signal proportional to the angle of incidence, taken with respect to a boresight which is the mean angular value of the displaced optical axes. The dtermination of the incident angle may then be used to locate the relative position of the light transmitting source from the receiver.

Figure 1:
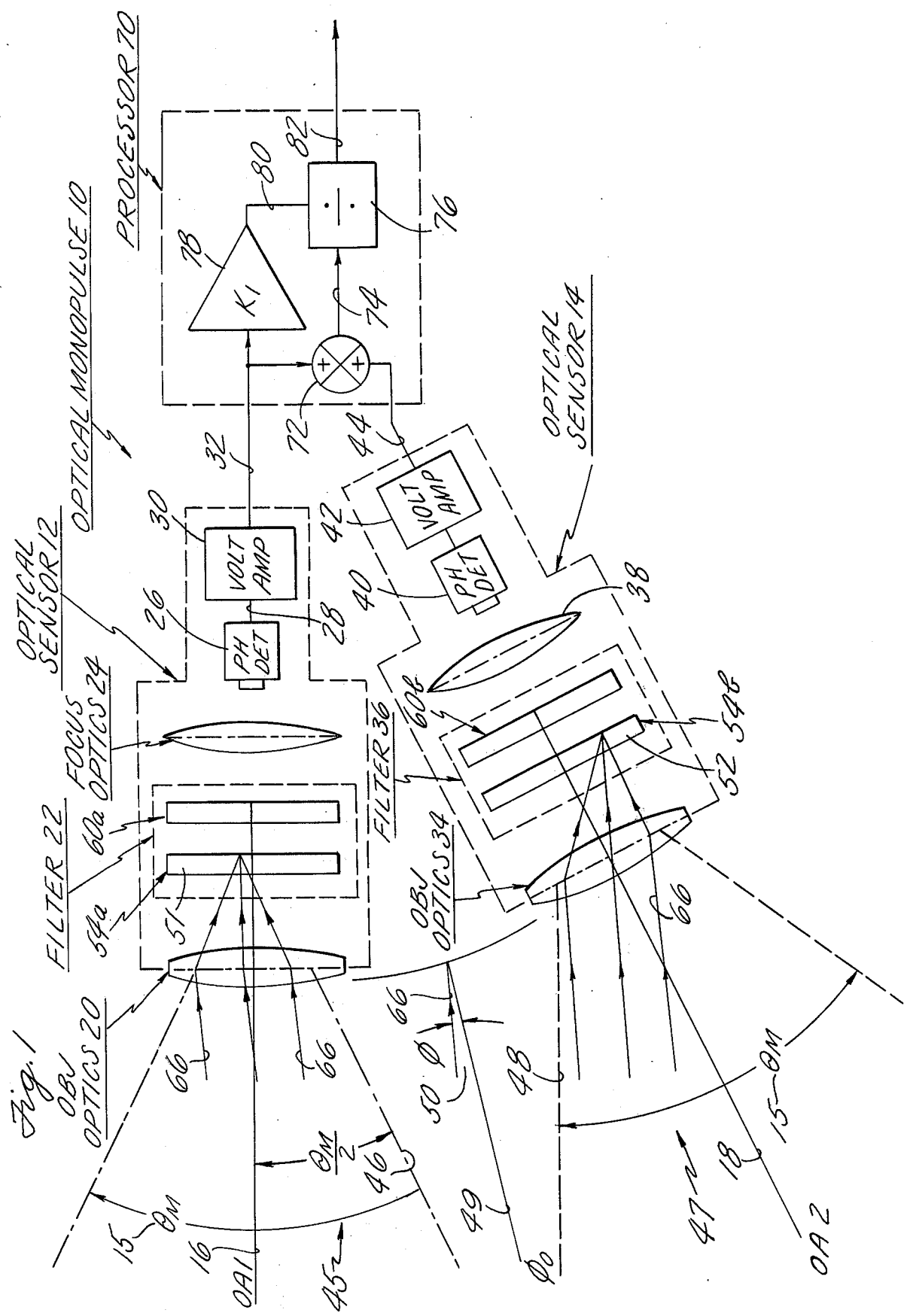
FIG. 1 is a schematic diagram of a monopulse optical receiver system in accordance with a preferred embodiment of the invention.

Referring now to FIG. 1, in a monopulse receiver system according to the present invention, a single optical monopulse 10 is comprised of optical sensors 12, 14 having identical fields of view ($\Theta_M$) 15, which are centered about the optical axis OA1 16 and OA2 18 of each sensor. The optical axis (OA1) 16 of the sensor 12 is perpendicular to an object optics assembly 20 which receives incident light at angles of incidence within the sensor field of view, and which may comprise a high speed, short focal length, converging lens assembly having suitable correction for both chromatic aberration and curvature of field. The object optics 20 converges the incident light rays to a spot on the surface of the filter 22, mounted behind and in alignment with the optics assembly, and which may be mounted in the optics assembly focal plane. The filter 22 has a predetermined transmittance function comprised of gradients which are distributed in such a manner as to provide attenuation of the incident light as a function of the spot on its surface at which the light rays converge. The spot at which the incident light rays converge is a function of the angle of incidence of the incident light taken with respect to the optical axis (OA1) 16, and therefore, the attenuation of the incident light by the filter 22 is also a function of the angle of incidence taken with respect to OA1. As described hereinafter, the filter transmittance gradient is distributed in a known manner so that the transmittance values provided by two of the optical sensors (such as sensors 12, 14) are mutually complementary within a monopulse sector provided by an overlapping field of view.

The attenuated light signal with intensity (I) emitted from the filter 22 is presented to a focus optics assembly 24 which is mounted adjacent to and parallel with the filter 22. The focus optics 24 focuses the attenuated light signal to the input of the photodetector 26, such as a photodiode or the like, which provides an analog voltage signal on a line 28 whose magnitude is proportional to the intensity (I) of the attenuated light signal. The signal on the line 28 is presented to an analog voltage amplifier 30 which provides an amplifier analog voltage signal on the line 32 having a magnitude proportional to the attenuated light signal, and therefore, to the angle of incidence of the incident light taken with respect to OA1 16. The optical sensor 14 is identical to the sensor 12 and is comprised of an object optics assembly 34, a filter 36, a focus optics assembly 38, a photodetector 40 and a voltage amplifier 42, which provides an analog voltage signal on a line 44 with a magnitude proportional to the angle of incidence of the incident light taken with respect to OA2 18.

The optical axis (OA2) 18 of the sensor 14 is angularly displaced from OA1 16 of the sensor 12 by an amount equal to one-half of the field of view ($\frac{1}{2}\Theta_M$), causing a portion 45 of the field of view of the sensor 12 bounded by OA1 16 and a dashed line 46, to overlap with a portion 47 of the field of view of the sensor 14 bounded by a dashed line 48 and OA2 18. This overlapping field of view, which is equal to the amount of angular displacement between the optical axes ($\frac{1}{2}\Theta_M$) represents the monopulse sector within which the angle of incidence of a single incident light pulse may be determined. A boresight angle $\phi_o$ 49 represents the mean angular displacement of the optical axes OA1 16, OA2 18. Light incident at an angle of incidence $\phi$ 50 within the overlapping field of view is received by the sensor 12 in the field of view portion 45 below (as viewed in FIG. 1) the first focal point (or object point) of the object optics 20, which lies on the axis OA1 16, and are converged to a spot above the second focal (or image point) in a portion 51 of the filter 22. The same angular values of incident light are received by the sensor 14 in the field of view portion 45 above the first focal point of the object optics 38 on the axis OA2 18, and are converged to a spot below the second focal point in a portion 52 of the filter 36.

Each of the filters 22, 36 have identical transmittance gradients which are of a known distribution for providing complementary transmittance values on mutually opposite portions of the filter surface, at equal increments along radial lines diverging from the optical axes. One simplified distribution for the transmittance gradient for the filters 22, 36 is comprised of linear functions of transmittance versus incident angle in two planes (X and Y) as shown in FIG. 2 for the X plane, and in FIG. 3 for the Y plane. Referring now to FIG. 2, the transmittance function in the X plane 54 is centered about an optical axis 55, identical to the optical axes OA1 16 and OA2 18 to provide transmittance gradients $t_{x1}$ 56 and $t_{x2}$ 58 over the range of the filter field of view ($\pm\frac{1}{2}\Theta_M$) in the X plane. As shown, the transmittance values are symmetrically distributed about the optical axis 55. Referring to FIG. 3, the transmittance function in the Y plane 60 is distributed in a complementary manner to that of the X plane as shown by the transmittance gradients $t_{y1}$ 62 and $t_{y2}$ 64, symmetrical about the optical axis 55 in the Y plane. While the transmittance gradients in both the X and Y planes are shown as a simple two-dimensional linear distribution in each plane, it should be emphasized that the transmittance gradients in both planes may be comprised of any known distribution such as that of a second order or an exponential distribution, which provides symmetrical transmittance values at equal increments along radial lines diverging from the optical axis. The total transmittance value presented to a light pulse incident on the filter surface is equal to the product of the transmittance gradients in both the X and Y planes, or $T = (t_x)(t_y)$. Therefore, an incident light pulse having an intensity S when received by the object optics 20, 34 (FIG. 1), has an intensity I after emerging from the filters 22, 40 defined as $I = S(t_x)(t_y)$.

Figure 4:
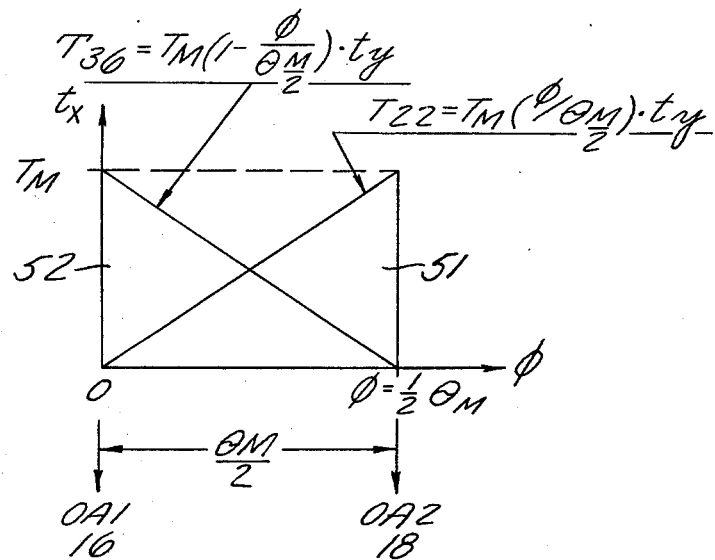
FIG. 4 is an illustration of the complementary transmittance gradients provided within an overlapping field of view by two optical sensors, in accordance with the preferred embodiment of FIG. 1.

Referring again to FIG. 1, since the transmittance functions of the filters 22, 36 are identical and light incident within the overlapping field of view is limited to convergence in the portions 51, 52, which correspond to the complementary transmittance products $(t_{x1})(t_{y1})$ and $(t_{x2})(t_{y2})$ respectively, the sensors 12, 14 provide complementary transmittance gradients to light incident within the overlapping field of view, and therefore, the light is attenuated in a complementary manner by each sensor. In the embodiment of FIG. 1, it is assumed that the portions of the fields of view of the sensors 12, 14 are overlapping in the X plane; therefore, complementary transmittance gradients are provided by the two sensors only in the X plane, and equal transmittance gradients are provided in the Y plane. The complementary transmittance gradients within the overlapping field of view in the X plane may be illustrated as shown in FIG. 4 where the combined transmittance functions of the filters 22, 36 is plotted against the angle of incidence ($\phi$) of light incident within the overlapping field of view having a magnitude $\frac{1}{2}\Theta_M$, and bounded by the optical axes OA1 16 and OA2 18. The transmittance gradient for the portion 51 of the filter 22 is defined by the expression $T_{22} = T_M((\phi)/\phi_M/2) \cdot t_y$ and the transmittance gradient for the portion 52 of the filter 36, it is defined by the expression $T_{36} = T_M(1 - (\phi)/\Theta_M/2) \cdot t_y$, where $T_M$ represents the maximum transmittance value for both portions. Since the transmittance gradients in the Y plane are equal for the sensors 12, 14 having an overlapping field of view in the X plane, the transmittance gradient of both sensors in the Y plane is represented by $t_y$.

Referring again to FIG. 1, in operation an incident light pulse (assumed to be collimated since the surface area of the object optics 20, 34 is small in comparison to the surface of the light pulse wave front) having a plurality of light rays 66 of intensity S, is received at an angle of incidence $\phi$ 50, taken with respect to the boresight angle $\phi_o$ 49 in the X plane. The voltage signals from the sensors 12, 14 ($V_{12}$, $V_{14}$) on the lines 32, 44 are defined by the expressions:

$$V_{12} = KS[T_M(\frac{\phi}{\Theta_M/2})] \cdot ty \qquad (1)$$

$$V_{14} = KS[T_M(1 - \frac{\phi}{\Theta M/2})] \cdot ty \qquad (2)$$

wherein S is the intensity of the light incident at the object optics 20, 34 and K is a scaling factor including the gain of the amplifiers 30, 42. Solving for S and equating the two expressions, the resultant expression in terms of the voltages $V_{12}$, $V_{14}$ and the transmittance gradients is defined as:

$$V_{14}(\frac{\phi}{\Theta_M/2}) = V_{12}(1 - \frac{\phi}{\Theta_M/2}) \qquad (3)$$

This expression is solved for the angle of incidence $\phi$ 50, in terms of the known quantity $\frac{1}{2}\phi_M$ and the voltages $V_{12}$, $V_{14}$, as defined by the expression:

$$\phi = \frac{\Theta_M}{2} \left( \frac{V_{12}}{V_{12} + V_{14}} \right) \qquad (4)$$

The value of the incident angle $\phi$ 50 is determined by processing the two voltage signals in a processor 70. The voltages $V_{12}$ and $V_{14}$ on the lines 32, 44 are presented to a summing junction 72 of the processor 70. The summing junction 72 provides the sum quantity $V_{12} + V_{14}$ through a line 74 to an analog divider 76, of a type well known to the art. The voltage signal $V_{12}$ on the line 32 is also presented to an amplifier 78 having a voltage gain $K_1$ equal to the constant value $\frac{1}{2}\Theta_M$. The amplifier 78 provides the signal $K_1 \times V_{12}$ through a line 30 to a second input of the analog divider 76. The analog divider 76 provides a signal proportional to the quantity $$\frac{K_1 V_{12}}{V_{12} + V_{14}} \qquad (5)$$

on an output line 82, which is equal to the incident angle value $\phi$ 50.

In the embodiment of the monopulse receiver system of FIG. 1, comprising a single optical monopulse, the total monopulse field of view is limited to the overlapping field of view provided by the two sensors 12, 14. Additional, independent overlapping field of view monopulse sectors may be provided by the addition of adjacently mounted optical sensors relatively disposed in a single plane so that the optical axis of each is displaced by one-half the sensor field of view to provide a continual arc of contiguous, independent monopulse sectors, such as (in FIG. 1) by the addition of sensors adjacently disposed with sensors 12, 14 to provide overlapping field of view which are contiguous to, but mutually exclusive with that provided by sensors 12, 14. The magnitude of an individual monopulse sector is determined by the sensors whose fields of view overlap, and is nominally equal to one-half the sensor field of view. Therefore, the total number of monopulse fields of view required for coverage C in one plane, where the sensors have a field of view $\Theta_M$, is equal to $2 \times C/\Theta_M$, and the total number of optical sensors required is equal to twice this value.

For a single optical monopulse, the angles of incidence of light incident within the monopulse sector may only be determined relative to the plane of the monopulse sector. The combination of at least three optical sensors, displaced such that one of the sensors has a portion of its field of view common with the overlapping portions of the fields of view of each of the other two sensors relatively disposed in two substantially orthogonal planes to form a common overlapping field of view, permits the monopulse processing of angles of incidence in each of the two orthogonal planes, allowing the determination of the angle of incidence for light incident in three dimensions within the common overlapping field of view. Therefore, the monopulse field of view coverage may be expanded to provide individual contiguous monopulse fields of view in two planes, providing coverage for any spatial region, such as a hemisphere, or any part thereof. FIG. 5 illustrates the disposition of optical sensors having equal fields of view in an array comprised of rows and columns, with the optical axes of adjacently mounted sensors displaced by an angle equal to one-half the field of view. Referring now to FIG. 5, sensors 90–98 having optical axes 100–108, and a field of view of $\Theta_M$ are disposed in an array of rows and columns such that each of the optical axes 100–108 are relatively displaced by $\frac{1}{2}\Theta_M$ from adjacent row and column sensors, as shown by the optical axis 108 of the sensor 98 which is displaced by $\frac{1}{2}\Theta_M$ from the optical axes 105, 107 of the adjacent sensors 95, 97. The array of sensors provide a plurality of equal, independent monopulse sectors which are orientated at different relative angular values to provide sensitivity in a space volume, and may be expanded through the addition of other row and column sensors as shown to provide sensitivity in a full hemisphere. The sensors may themselves be arranged in a planar array or in a curvilinear array (such as a hemisphere).

Figure 6:
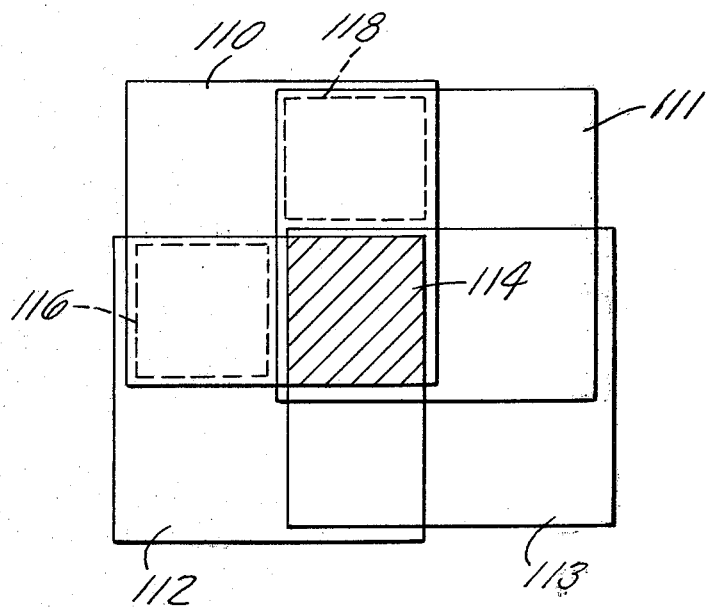
FIG. 6 is an illustration of the overlapping fields of view of four of the optical sensors mounted in rows and columns in accordance with the preferred embodiment of FIG. 5.

FIG. 6 is an illustration of a common overlapping field of view provided by the relative displacement of the sensors 90–98 in FIG. 5, and is comprised of portions of at least two different overlapping fields of view, each one of which lies in a plane which is substantially orthogonal to the other, and each one of which has a portion which is common with the other. The fields of view of all the sensors are assumed to be squarely shaped at a point in space, as may appear in a cross section of the field of view of a cylindrical object optics lens, although the field of view may be shaped conically, rectangularly or in any shape permitted through the use of object optics lenses known in the art. The square sections 110–113 represent the spatial field of view of the sensors 94, 95, 97 and 98 respectively, shown slightly displaced from each other for the purpose of clarity of illustration, but normally in full alignment. As shown, the fields of view 110, 111 of the sensors 94, 95 overlap by one-half to provide an overlapping field of view in the row containing both sensors. In addition, the field of view 110 overlaps by one-half the field of view 112 of the sensor 97, to provide an overlapping field of view in the column containing the sensors 94, 97. The row and column overlapping fields of view have a portion of each which is common with the other to form a monopulse sector 114 which is equal in magnitude to the common overlapping field of view, or one-quarter of the field of view of the individual sensors. The monopulse sector 114 is capable of receiving light incident in three dimensions, with the sensors 94, 95 providing complimentary signals proportional to the angle of incidence relative to the plane of the row containing these sensors, and the sensors 94, 97 providing complimentary signals proportional to the angle of incidence relative to the column containing these sensors. Although the monopulse sector 114 need only be comprised of the common portion of the fields of view of three optical sensors relatively disposed in a row and a column to provide a sector within which the angle of incidence may be determined in three dimensions, the practical considerations of building an array capable of providing a multiplicity of contiguous monopulse sectors favors the overlapping of a common portion of the fields of view of four sensors, as shown by the field of view 113 of the sensor 98 overlapping the hereinbefore mentioned fields of view. The combination of overlapping fields of view of other sensors (not shown in FIG. 6) provide additional contiguous monopulse sectors, such that the overlapping fields of view of the sensors 93, 94, 96 and 97 (FIG. 5) overlap to form a monopulse sector bounded by the dashed line 116 (FIG. 6) while the overlapping fields of view of the sensors 91, 92, 94 and 95 provide a monopulse sector bounded by the dashed line 118. Therefore, in the array of FIG. 5, each monopulse sector is comprised of common portions of the overlapping fields of view of four adjacent row and column sensors, and each monopulse sector is therefore uniquely defined. Also, the monopulse sectors are contiguous so that any light incident upon the surface of the array is received by one of the monopulse sectors, and since each sector has a known relative angular position, the coarse angle of incidence is immediately determined by detecting which of the row and column sensors have output voltage signals. The coarse angle being the mean angular value (119, FIG. 6) of the displaced optical axes of the four sensors whose fields of view comprise the monopulse field of view sector.

Figure 7:
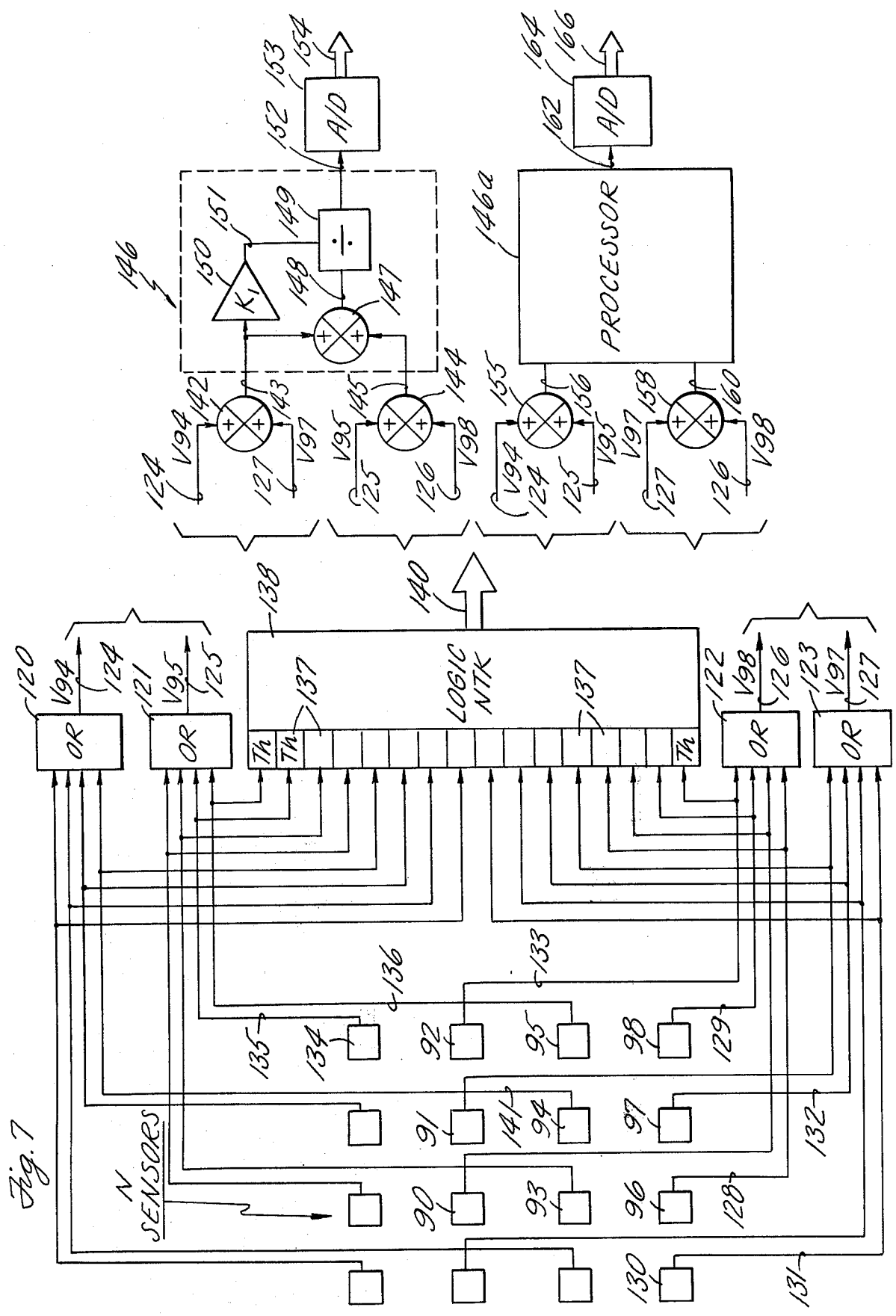
FIG. 7 is a functional block diagram of the signal processing of the preferred embodiment of FIG. 5.

Referring now to FIG. 7, a monopulse optical receiver has N optical sensors, comprised in part of the sensors 90–98 (FIG. 5), mounted in an array. The output signals from the N sensors are connected to analog OR circuits 120–123 having output lines 124–127. As described hereinbefore, light incident upon the surface of the array is received only within the monopulse sector whose field of view encompasses the particular angle of incidence, and therefore, only the four sensors whose fields of view comprise the monopulse sector within which light is incident provide output voltages, which are presented through the OR circuits 120–123 to output lines 124–127. This is accomplished by connecting alternate row and alternate column sensor outputs to a different one of each of the four OR circuits. To illustrate, the outputs of the sensors 96, 98 of the bottom row (as viewed in FIG. 7) are connected by lines 128, 129 to the OR circuit 122, while the sensors 130, 97 of the same row are connected by lines 131, 132 to the OR circuit 123. Similarly, the sensors 92, 98 of the right hand column (as viewed in FIG. 7) are connected by lines 133, 129 to the OR circuit 122, while the sensors 134, 95 are connected by lines 135, 136 to the OR circuit 121. The individual sensor outputs are also connected through N threshold detectors 137, of a type well known to the art, to a logic network 138. The threshold detectors provide discrete logic signals to the logic network 138 in response to the detection of sensor voltage signals in excess of a predetermined threshold value. The logic network 138 is comprised of logic circuitry well known to the art for decoding the threshold detector signals, to provide a digital signal of M bits on output lines 140 representing the coarse angle of incidence (the mean angular value of the four displaced optical axes of the sensors comprising the monopulse sector within which light is incident).

The four voltage signals on the lines 124–127 are processed in a manner similar to that performed in the embodiment of FIG. 1 to determine the angle of incidence with respect to each of the two planes (X, Y) of the array, as described hereinbelow. Since adjacent optical sensors provide complementary transmittance values only for those components of the incident angle which lie in the plane in which the fields of view of adjacent sensors overlap, and provide a common value of transmittance for incident angle components lying in the plane that is orthogonal to the plane in which the sensor fields of view overlap (as described hereinbefore with respect to the single monopulse sensor of FIG. 1 wherein adjacent optical sensors 12, 14 having overlapping fields of view in the X plane provide equal values of transmittance in the Y plane), adjacent sensors overlapping in the Y plane provide a common X plane transmittance and adjacent sensors overlapping in the X plane provide a common Y plane transmittance.

In operation, the sensors 94, 95, 97, 98 whose fields of view have a common portion comprising the monopulse sector 114 (FIG. 6), provide voltage signals $V_{94}$, $V_{95}$, $V_{97}$, and $V_{98}$ on the lines 141, 136, 132, and 129, through the OR circuits 120, 121, 123 and 122 respectively, to the lines 124–127. The angular component of the incident light angle lying in the X plane is determined by first summing the voltage signals from adjacent sensors whose fields of view overlap in the Y plane, (which in FIG. 6 are shown as sensors 94, 97 and 95, 98), and therefore, the voltage signals $V_{94}$, $V_{97}$ on the lines 124, 127 are presented to a summing junction 142, which provides the sum of the two signals on a line 143. Similarly, the voltage signals $V_{95}$, $V_{98}$ on the lines 125, 126 are presented to a summing junction 144, which provides the sum of the two signals on a line 145. The voltage signals on the lines 143, 145 are processed in an identical manner to that described hereinbefore for the voltage signals $V_{12}$, $V_{14}$ for the single optical monopulse of FIG. 1, by a processor 146, wherein the signals on the lines 143 and 145 are presented to a summing junction 147, which provides the sum quantity on a line 148 to an analog divider 149. The signal on the line 143 is also presented to an amplifier 150 having a gain $K_1$ equal to the constant ½$\Theta_M$, which provides an output signal on a line 151 to a second input of the divider 149. The divider provides a signal representative of the quantity:

$$\phi_x = \frac{\Theta_M}{2} \frac{(V_{94} + V_{97})}{V_{94} + V_{97} + V_{95} + V_{98}} \quad (6)$$

on a line 152, which represents the angle of incidence taken with respect to the X plane. The signal on the line 152 is presented to an analog to digital converter 153 which provides a digital signal on the lines 154, representative of the angle value in the X plane. The angle of incidence taken with respect to the Y plane is determined in an identical manner by first summing the voltage signals from adjacent sensors having overlapping fields of view in the X plane. Therefore, the voltage signals $V_{94}$, $V_{95}$ on the line 124, 125 are presented to a summing junction 155 which provides the sum of the two signals on a line 156, and the voltage signals $V_{97}$, $V_{98}$ on the lines 127, 126 are presented to a summing junction 158, which provides the sum of the two signals on a line 160. The voltage signals on the lines 156, 160 are presented to a processor 146a, identical to the processor 146 which provides the quantity:

$$\phi_y = \frac{\Theta_M}{2} \frac{(V_{94} + V_{95})}{V_{94} + V_{95} + V_{97} + V_{98}} \quad (7)$$

on a line 162, which represents the angle of incidence taken with respect to the Y plane. The signal on the line 162, is presented to an analog to digital converter 164 which provides a digital signal on the lines 166 representative of the angle value in the Y plane. The digital signals on the lines 140 (coarse angle value), 154 (fine angle value in X plane) and 166 (fine angle value in Y plane) may be combined to provide a single digital word descriptive of the angle of incidence.

The optical monopulse described in the embodiment of FIG. 1, is comprised of two identical optical sensors each having complementary transmittance gradients centered about their respective optical axes, and the two being relatively displaced such that their optical axes are displaced by a value equal to one-half of the field of view of each, with successive adjacent optical sensors similarly displaced to provide a plurality of contiguous monopulse sectors of a magnitude equal to one-half of the field of view of each sensor. An alternative embodiment of a monopulse optical sensor, comprises the use of two optical sensors disposed as dedicated pairs, each one of the pair being in parallel alignment with the other, such that the field of view of one overlaps entirely the field of view of another, and each of the sensors having a single continuous transmittance gradient in each plane, extending across the entire field of view, with the sensors being further disposed to provide complementary transmittance gradients within the 100% overlap of the field of view of each. The dedicated pairs of optical sensors provide monopulse field of view sectors having a magnitude equal to the full field of view $\Theta_M$ of each sensor. Additional dedicated pairs of optical sensors may then be relatively displaced adjacent to each other such that the limits of the fields of view of each pair abut the field of view limit of an adjacent pair to provide a plurality of contiguous monopulse sectors each having a field of view equal to $\Theta_M$.

Figure 8:
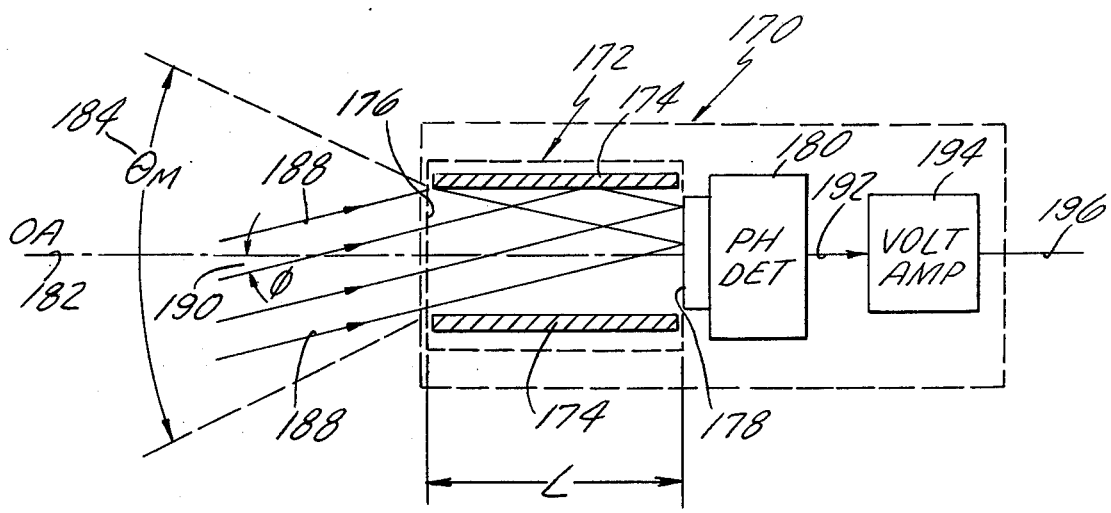
FIG. 8 is an illustration of an alternative embodiment of an optical sensor used in the preferred embodiments of FIGS. 1 and 5.

The optical sensors of the exemplary embodiments described hereinbefore each comprise an object optics assembly, a transmittance filter, and focus optics, to provide an attenuated light signal to a photodetector as a function of the angle of incidence. In an alternative, simplified embodiment of an optical sensor 170, shown in FIG. 8, the object optics assembly, transmittance filter, and focus optics are replaced by a light shield 172, or aperture in the form of a hollow tube having solid opaque walls (shown partially by the walls 174). The light shield 172 functions as a conduit for transmitting light incident at an input end 176 to an output end mounted to the light sensitive area 178 of a photodetector 180, to provide a light hermetic seal. The light shield 172 has a length L along an optical axis (OA)182 of the sensor 170, which in combination with the area of the light sensitive surface 178 determine the sensor field of view $\Theta_M$ 184. The light incident at the open end 176 of the light shield 172 is conducted to the light sensitive surface 178 of the photodetector 180 with an intensity (I) which is directly proportional to the angle of incidence taken with respect to the optical axis 182. Light incident at a zero angle of incidence (parallel to OA 182) is conducted with no appreciable attenuation to the conducting surface 178 of the photodetector 180. For an incident light pulse comprising a plurality of light rays 188 having an angle of incidence $\phi$ 190 with respect to OA 182, only some portion of the rays received at the opening 176 are conducted directly to the light sensitive surface 178, while the remaining light rays are reflected off of the walls 174, and are received by the light sensitive surface 178 at a reduced intensity due to the light lost in refraction through the walls 174, and also due to finite phase differences between the directly received light rays and the reflected rays. The photodetector 180 provides a voltage signal proportional to the intensity of the light received at the surface 178 through a line 192 to a voltage amplifier 194, which provides a signal on a line 196 with a magnitude proportional to the angle of incidence $\phi$ 190. The processing of the signal on a line 196 together with the signals of identical, adjacent sensors having their optical axes displaced by an angular value equal to the desired overlapping field of view, are processed in an identical manner to that described hereinbefore with respect to the embodiments of FIGS. 1, 5 and 7.

The sensor 170 provides a low cost, simplified, alternative embodiment of an optical sensor capable of producing an output signal manifestation of the angle of incidence of light incident upon the surface of the sensor. In addition to the simplified low cost construction, the sensor 170 provides a diversity of sensor characteristics and configurations, such that: the length L of the shield 172 may be varied in conjunction with the light sensitive area 178 to provide any value of angular field of view; the walls 174 of the light shield 172 may comprise light absorbing material, so that light reflection off of the walls is reduced, providing a more sharply defined intensity of the incident light received at the surface 178; and suitable converging lens assembly may be employed between the light shield 172 and the photodetector 180 to permit the reduction of the area of the light sensitive surface 178 and/or an increased dimension for the diameter of the light shield 172.

The monopulse optical receiver system of the present invention is comprised of individual optical sensors each of which is comprised of filters, or angularly dependent light shield apertures, whose transmittance distribution may be varied from a simple linear density distribution which is complementary about the optical axis of the sensor as described hereinbefore to any alternative transmittance distribution providing a complementary density distribution between adjacent optical sensors within the region of their overlapping fields of view. Similarly, the choice of the value of the field of view for the individual optical sensors determines the cost of the object optics required and provides a great degree of flexibility in determining cost versus quantity of the required plurality of sensors. The added flexibility in system design (from a single monopulse sector to a hemisphere comprised of individual monopulse sectors) permits the use of the monopulse optical receiver system of the present invention in the vast field of both military and commercial usages. One such commercial use is that for providing guidance information for self-propelled vehicles used to transport material in industrial facilities. A number of monopulse optical sensors, mounted at predetermined angular positions on the vehicle and used in conjunction with a light transmitting source within such a vehicle, provides information on the existance and location of obstructions in the path of the vehicle. Similarly, although the invention has been shown and described with respect to illustrative embodiments thereof, it should be understood by those skilled in the art that the foregoing and various other changes, omissions and additions in the form and detail thereof may be made therein without departing from the spirit and the scope of the invention.

Having thus described typical embodiments of our invention, that which we claim as new and desire to secure by Letters Patent is:

1. A monopulse optical receiver system, comprising:
   a plurality of optical sensor means for receiving incident light at angles of incidence within a field of view and for providing in response thereto a signal manifestation of the angle of incidence thereof, each of said sensor means including,
   a. filter means having a biplanar transmittance function comprised of complementary transmittance gradient portions centered about an optical axis for providing complementary transmittance values along mutually opposite radial lines diverging from the optical axis, said filter means providing attenuation of light incident on the surface of said filter means as a function of the angle of incidence taken with respect to the optical axis,
   b. optics means for converging the light incident on said sensor means to a spot on the surface of said filter means, and
   c. means for providing a voltage signal in response to attenuated light passing through said filter means,
   said sensor means being relatively disposed in rows and columns such that the optical axes of at least two of said sensor means disposed in a row are relatively displaced to provide an overlap of mutually complementary transmittance gradient portions of the field of view of each of the two row sensor means so as to provide an overlapping field of view in a row, and such that the optical axes of at least two of said sensor means disposed in a column are relatively displaced to provide an overlap of mutually complementary transmittance gradient portions of the fields of view of each of the two column sensor means so as to provide an overlapping field of view in a column, and such that a portion of the overlapping field of view in the row is common with a portion of the overlapping field of view in the column to provide a common overlapping field of view, the sensor means comprising the common overlapping field of view providing mutually complementary voltage signals in response to the light incident within the common overlapping field of view;

means responsive to all of said sensor means for providing a signal for identifying which of said sensor means are providing said complementary voltage signals, thereby identifying the common overlapping field of view within which light is incident;

means responsive to the complementary voltage signals of said sensor means disposed in a row and having an overlapping field of view which is in a common overlapping field of view within which the light is incident, for providing a signal which is representative of the ratio of one voltage signal of the complementary voltage signals to the sum of the complementary voltage signals, the ratio signal being proportional to the angle of incidence of the incident light taken with respect to the row containing said field of view; and means responsive to the complementary voltage signals of said sensor means disposed in a column and having an overlapping field of view which is also in the common overlapping field of view within which the light is incident, to provide a signal which is representative of the ratio of one voltage signal of the complementary voltage signals to the sum of the complementary voltage signals, the ratio signal being proportional to the angle of incidence of the incident light taken with respect to the column containing said field of view.

2. A monopulse optical receiver system comprising:
a plurality of optical sensor means for receiving incident light at angles of incidence within a field of view and for providing in response thereto a signal manifestation of the angle of incidence thereof, each of said optical sensor means including,
 a. filter means having a transmittance gradient for providing attenuation of the light incident on a surface of said filter means as a function of the angle of incidence,
 b. optics means for converging the light incident on said sensor means to spot on the surface of said filter means, and
 c. means for providing a voltage signal in response to attenuated light passing through said filter means,
at least two of said sensor means being relatively disposed so that a portion of the field of view of one of them overlaps with a portion of the field of view of another one of them so as to provide an overlapping field of view, said two sensor means having complementary transmittance gradients within the overlapping field of view, said two sensor means providing mutually complementary voltage signals in response to the light incident thereon within the overlapping field of view; and
 processing means responsive to said complementary voltage signals for providing a signal proportional to the angle of incidence of the light incident on said two sensor means within the overlapping field of view.

3. A system according to claim 2, wherein said processing means comprises:
 means responsive to said complementary voltage signals for providing a signal which is representative of the ratio of one voltage signal of said complementary voltage signals to the sum of said complementary voltage signals, said ratio signal being proportional to the angle of incidence of the light incident on said two sensor means within the overlapping field of view.

4. A system according to claim 2, wherein there are at least three of said optical sensor means relatively disposed so that a portion of the field of view of each of at least two of said sensor means overlaps with a portion of the field of view of at least one other of said sensor means to provide two mutually exclusive overlapping fields of view, and wherein said processing means further comprises means responsive to all of said sensor means for providing a signal for identifying which of said sensor means are providing said complementary voltage signals, thereby identifying the overlapping field of view within which light is incident.

5. A system according to claim 2, wherein said optical sensor means are relatively disposed to provide at least one overlapping field of view in each of two substantially orthogonal planes, a portion of at least one overlapping field of view in one plane being common with a portion of at least one overlapping field of view in the other plane so as to provide a common overlapping field of view, each of said sensor means having a biplanar transmittance function for providing complementary transmittance gradients to light incident in three dimensions within said common overlapping field of view.

6. A system according to claim 5, wherein each of said optical sensor means comprises:
 filter means having a biplanar transmittance gradient for providing attenuation of light incident on a surface of said filter means as a function of the angle of incidence;
 optics means for converging the light incident on said sensor means to a spot on the surface of said filter means; and
 means for providing a voltage signal in response to attenuated light passing through said filter means.

7. A system according to claim 5, wherein said processing means comprises:
 means responsive to the complementary voltage signals of said sensor means having a first overlapping field of view in one of the two substantially orthogonal planes, a portion of which is in a common overlapping field of view within which the light is incident, for providing a signal which is representative of the ratio of one voltage signal of the complementary voltage signals to the sum of the complementary voltage signals, the ratio signal being proportional to the angle of incidence of the light taken with respect to the plane of said field of view; and
 means responsive to the complementary voltage signals of said sensor means having a second overlapping field of view in another of the two substantially orthogonal planes, a portion of which is also in the common overlapping field of view within which the light is incident, to provide a signal which is representative of the ratio of one voltage signal of the complementary voltage signals to the sum of the complementary voltage signals, the ratio signal being proportional to the angle of incidence of the incident light taken with respect to the plane of said other field of view.

8. A system according to claim 5, wherein said optical sensor means are relatively disposed to provide at least two different overlapping fields of view in each plane with portions of each of said two different overlapping fields of view in one plane being common with portions of a different one of each of said two different overlapping fields of view in the other plane so as to provide at least two different common overlapping fields of view, and wherein said processing means further comprises means responsive to the voltage signals from said sensor means for providing a signal for identifying which of said sensor means are providing the complementary voltage signals, thereby identifying the common overlapping field of view within which the incident light is impinging.

9. A system according to claim 5, wherein said biplanar transmittance function of each of said optical sensor means is comprised of complementary transmittance gradient portions centered about an optical axis, the optical axes of at least two of said sensor means being relatively displaced to provide each of the overlapping fields of view, and being relatively displaced so that light incident within the overlapping field of view is received by complementary transmittance gradient portions of each of said two sensor means.

* * * * *

UNITED STATES PATENT OFFICE
CERTIFICATE OF CORRECTION

PATENT NO. : 3,987,297
DATED : October 19, 1976
INVENTOR(S) : Michael J. Brienza and Paul M. Danzer It is certified that error appears in the above—identified patent and that said Letters Patent are hereby corrected as shown below:

Column 1, line 16, "ligh" should read --light--

Column 3, line 10, "veiw" should read --view--

Column 4, line 3, "dtermi-" should read -- determi- --

Column 6, line 7, "$T_{22} = T_M ((\emptyset)/\emptyset_M/2) \cdot ty$" should read $$--T_{22} = T_M ((\emptyset)/\theta_M/2) \cdot ty"$$

Column 6, line 60, "30" should read --80--

Signed and Sealed this

Twenty-first Day of December 1976

[SEAL]

*Attest:*

RUTH C. MASON
*Attesting Officer*

C. MARSHALL DANN
*Commissioner of Patents and Trademarks*